Figure 4:
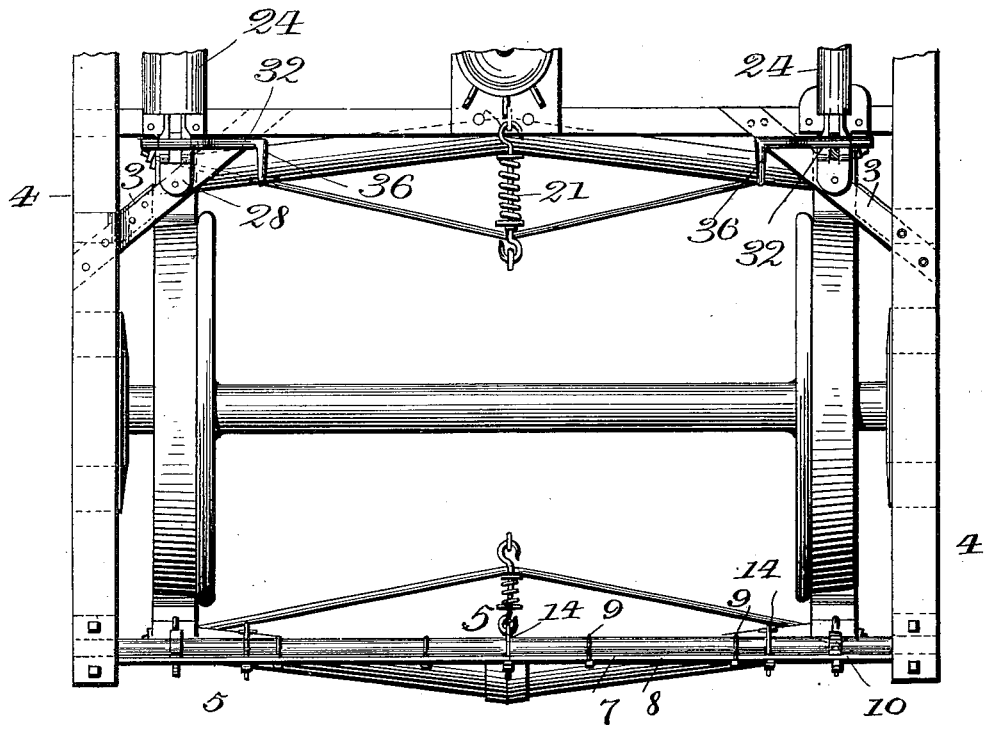

No. 654,241.  
J. S. FRANCIS.  
CAR BRAKE.  
(Application filed May 18, 1899.)  
Patented July 24, 1900.
(No Model.)  
5 Sheets—Sheet 1.
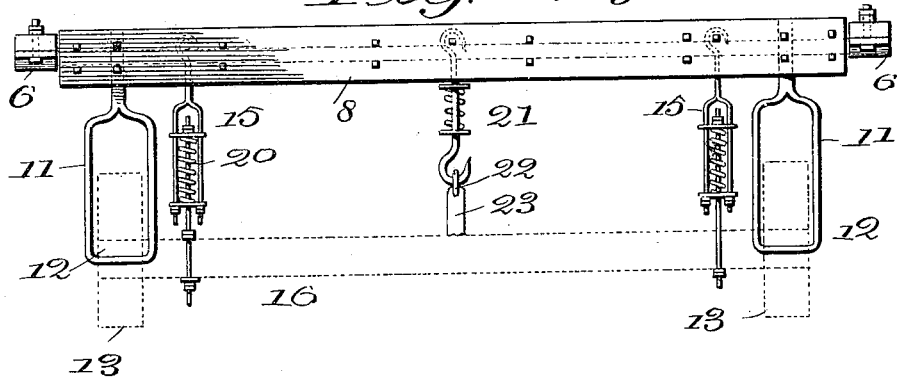
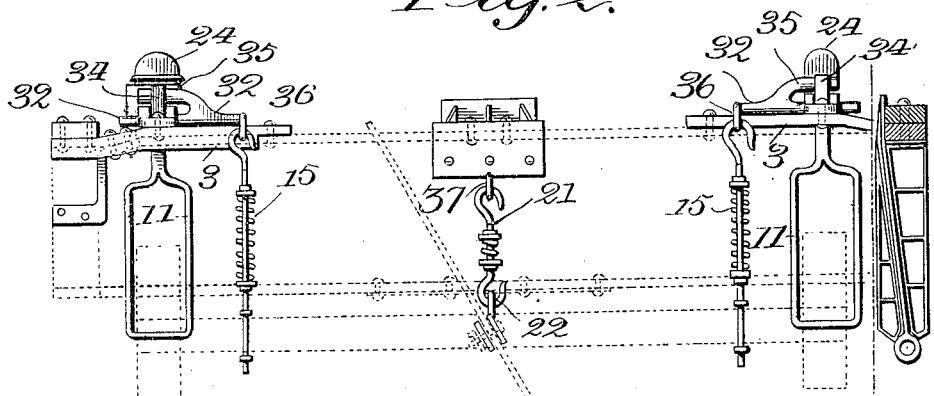
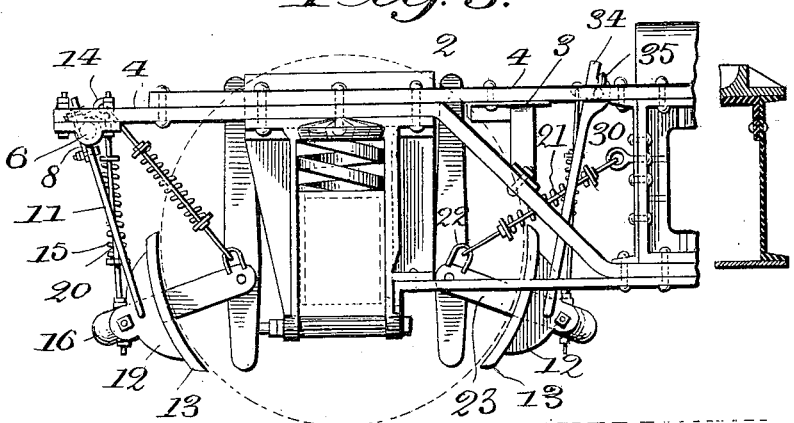
WITNESSES  
L. C. Hills  
INVENTOR  
John S. Francis  
BY  
W. A. Redmond  
ATTORNEY.
THE NORRIS PETERS CO., PHOTO-LITHO., WASHINGTON, D. C.

No. 654,241. Patented July 24, 1900.
J. S. FRANCIS.
CAR BRAKE.
(Application filed May 18, 1899.)

(No Model.) 5 Sheets—Sheet 2.

WITNESSES:
L. C. Hills.

INVENTOR
John S. Francis
BY
W. A. Redmond
ATTORNEY.

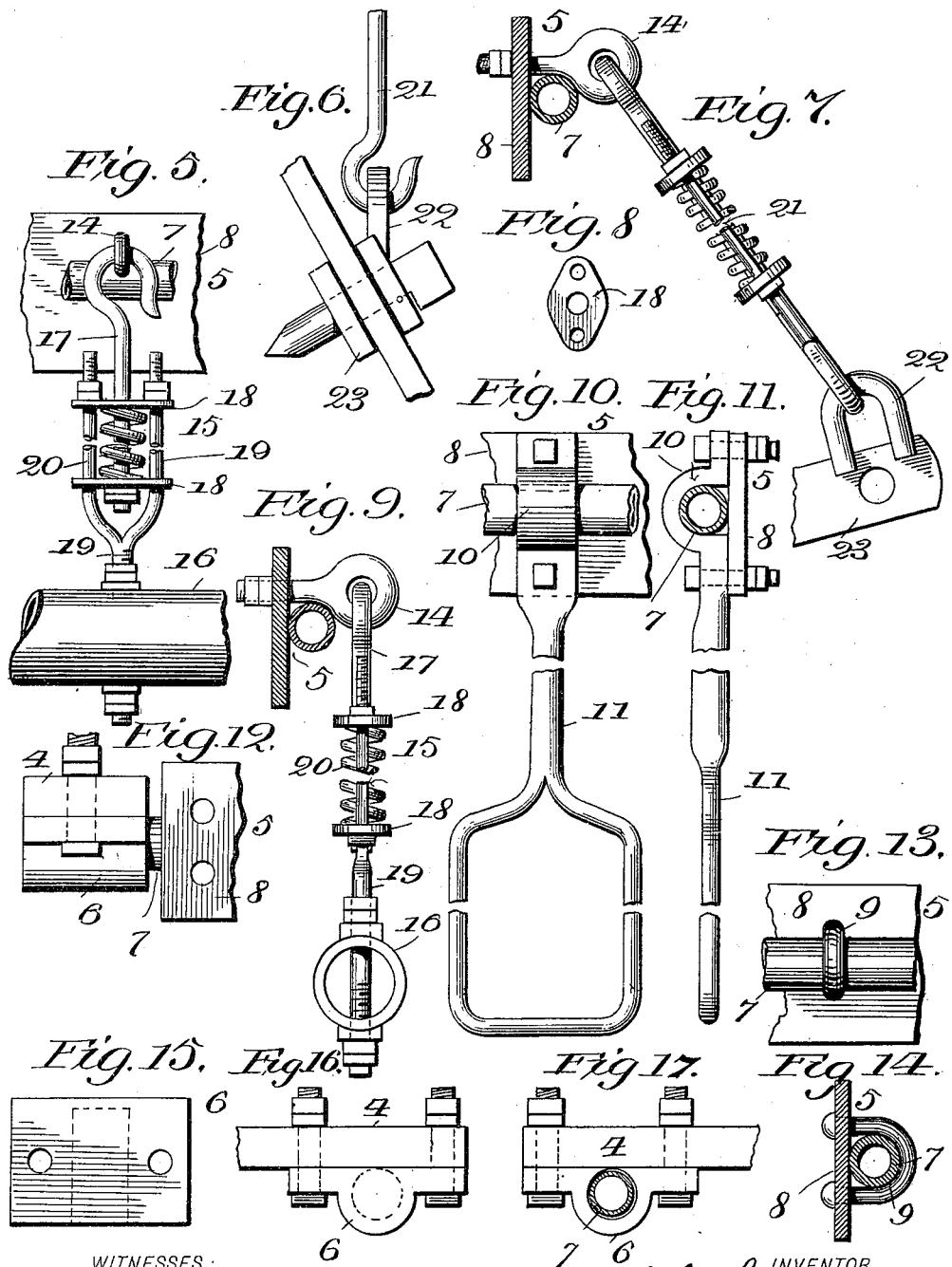

No. 654,241. Patented July 24, 1900.
J. S. FRANCIS.
CAR BRAKE.
(Application filed May 18, 1899.)
(No Model.) 5 Sheets—Sheet 4.
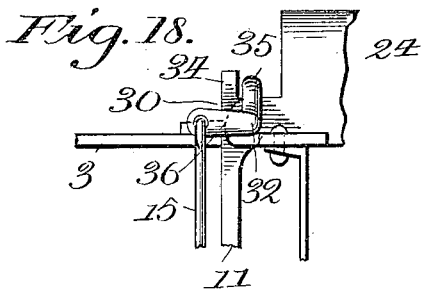
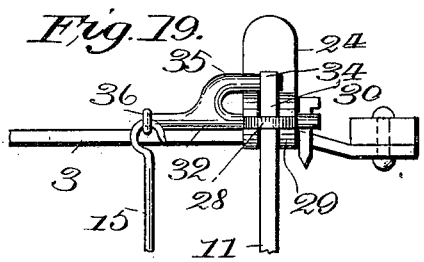
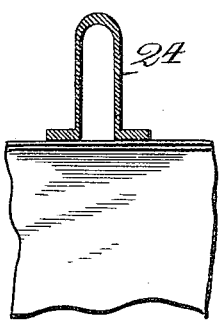
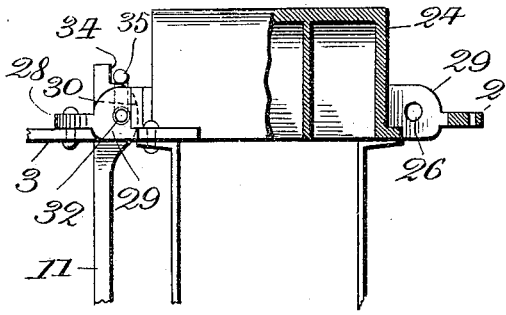
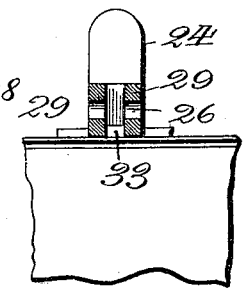
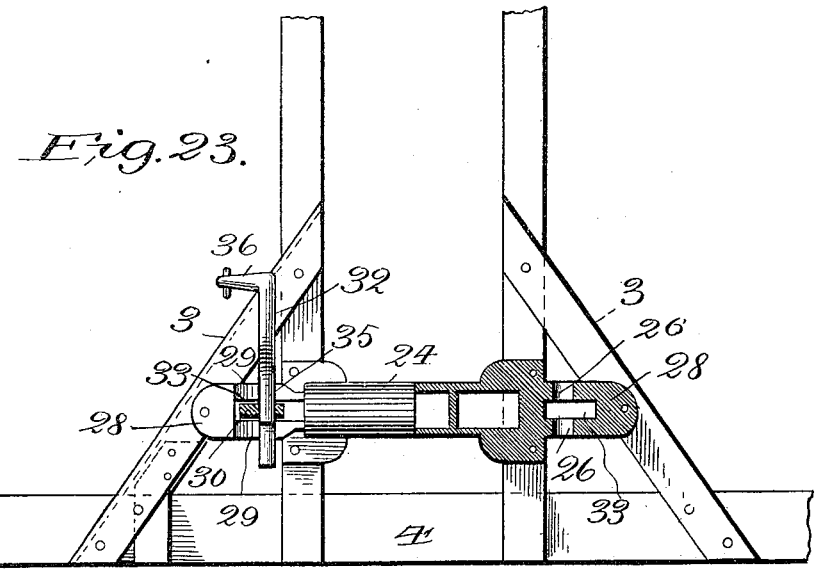

No. 654,241. Patented July 24, 1900.
J. S. FRANCIS.
CAR BRAKE.
(Application filed May 18, 1899.)
(No Model.) 5 Sheets—Sheet 5.
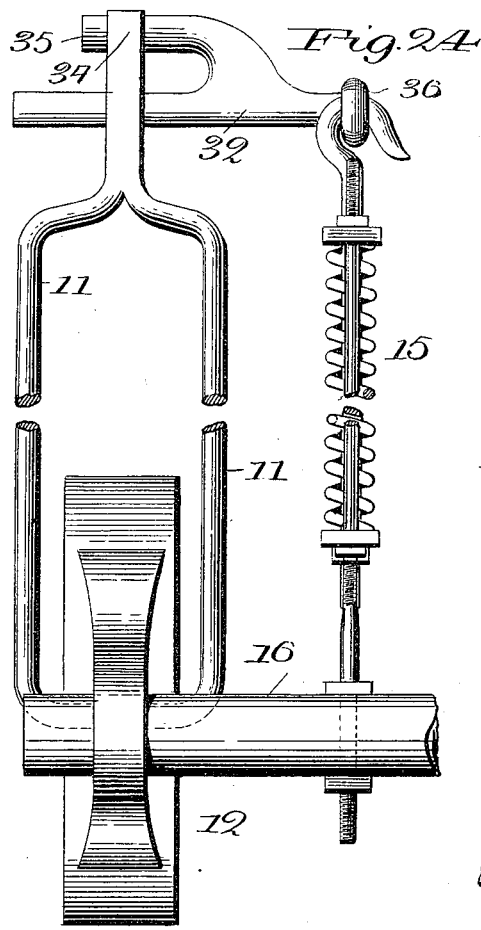
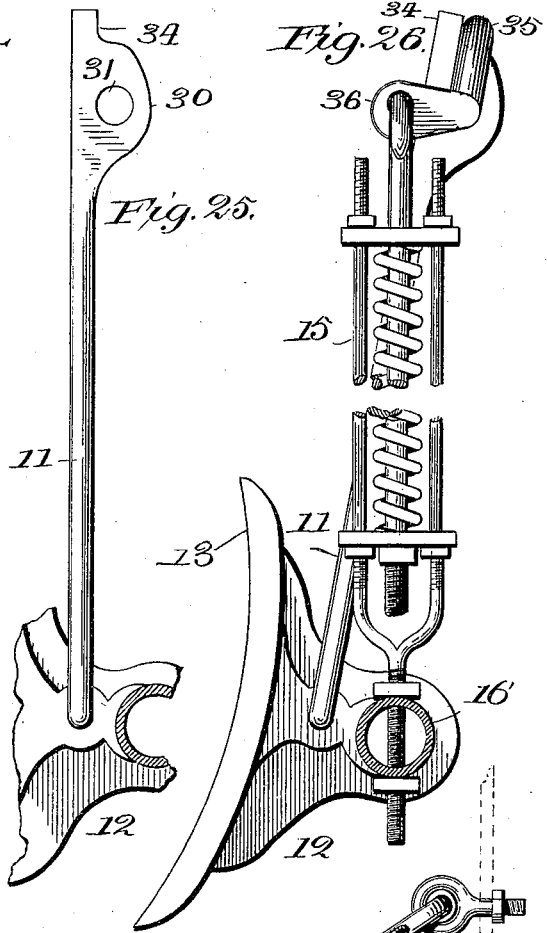
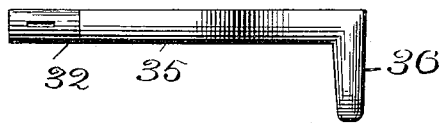
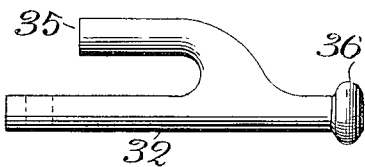
WITNESSES:
L. C. Hills
L. C. Butler
INVENTOR
John S. Francis
BY
M. W. Redmond
ATTORNEY.

UNITED STATES PATENT OFFICE.

JOHN S. FRANCIS, OF BLOOMINGTON, ILLINOIS.

CAR-BRAKE.

SPECIFICATION forming part of Letters Patent No. 654,241, dated July 24, 1900.

Application filed May 18, 1899. Serial No. 717,314. (No model.)

*To all whom it may concern:*

Be it known that I, JOHN S. FRANCIS, a citizen of the United States, residing at Bloomington, in the county of McLean and State of Illinois, have invented certain new and useful Improvements in Car-Brakes; and I do declare the following to be a full, clear, and exact description of the invention, such as will enable others skilled in the art to which it appertains to make and use the same.

This invention relates to brakes for railway-cars, and has for its object to provide an automatic release of the brake when the power is off, of few parts, simple and durable in construction, and comparatively inexpensive, and having both the inside and outside hung brakes supported directly from the truck instead of, as is usual for outside hung brakes, from the car-body; and it consists in the parts and combinations of parts hereinafter described and claimed.

In the accompanying drawings, forming a part of this specification, Figure 1 is a front elevation of my improved rocker cross-bar and break-beam connections for outside-hung brakes; Fig. 2, a similar view of my invention for supporting inside-hung brakes; Fig. 3, an end elevation of one-half of a truck, showing both the outside and inside hung brakes; Fig. 4, a plan view of a truck, showing the arrangement of my brake attachment thereon; Fig. 5, a detail front view of safety-rod and its connections; Fig. 6, a detail view showing attachment of adjusting-rod to brake-lever fulcrum; Fig. 7, a detail view, in side elevation, of adjusting-rod and its connections; Fig. 8, a detail plan view of spring-plate for safety-rods and adjusting-rod; Fig. 9, a side elevation of the safety-rod and its connections; Fig. 10, a detail front elevation of brake-hanger and its connections; Fig. 11, a side elevation of the same; Fig. 12, a side view of rocker-bar journal-box; Fig. 13 a detail front, and Fig. 14 a detail vertical section, of the rocker cross-bar; Figs. 15, 16, and 17, detail plan and end views of the journal-box for the rocker cross-bar; Fig. 18, a detail view of side-bearing and safety-rod supporting-pin, showing their arrangement; Fig. 19, a side view of the same; Figs. 20, 21, and 22, a vertical transverse section, a side elevation in half-section, and a detail end view, partly in section, respectively, of the side bearing; Fig. 23, a plan view in half-section showing arrangement of side bearing on truck-frame; Fig. 24, an enlarged detailed front view of the brake-hanger, safety-rod, and supporting-pin; Fig. 25, a side elevation of brake-hanger; Fig. 26, a side view of the safety-rod and brake-hanger, showing their connections with supporting-pin; Figs. 27 and 28, a top plan and a side elevation, respectively, of the supporting-pin; and Fig. 29, a side elevation of the adjusting-rod.

Similar numerals refer to similar parts throughout all the views.

It is the common practice in equipping freight-cars with outside-hung brakes to hang them from the body of the car. This manner of hanging such brakes is open to many objections, among which may be mentioned that where the car is mounted on spring bolster-trucks and the bolster interposed between the truck-transoms or cross-timbers both the bolster and transom or cross-timbers are liable to be twisted or canted from their true level positions, and thereby force the truck out of its set position and toward one or the other end of the car or longitudinally of the car-body, and thus preventing to some extent the application of the full braking power of the brakes to all the wheels. This is due to the fact that the shifting of the truck longitudinally brings the brakes at one end of the truck nearer to the wheels, and consequently into action earlier and with greater pressure than the brakes at the other end. It also follows that the shifting of one truck of a car at one end, as described, without a corresponding shifting of the truck at the other end of the car results in preventing the application of equal power to each truck, since the throw of the brake-rod is shortened or lengthened, according to the distance the brake-shoes must move before they engage the wheels, and it is obvious that if one set of brakes are fully engaged with the wheels on one truck before the set for the other truck is fully engaged the latter cannot exert their full power, as the engagement of the other set limits the further movement of the brake-rod to apply the necessary pressure.

Another objectionable feature of the present arrangement of the outside-hung brakes is the lateral motion to which they are liable, which renders it necessary to employ wheel-guides, or what are commonly known as "spikes"—that is, a bolt connected to the brake-beam and arranged in position to bear against the inner faces of the car-wheels in order to hold the brake-shoes in line with the wheels. The friction on the spikes soon wears them away, and thus permits of the lateral displacement of the brake-shoes. Moreover, it is found that such guides or spikes are frequently so bent or broken as to permit of the brake-shoes vibrating or moving laterally to such an extent as to entirely miss the wheel when the brakes are set or applied. Also it has been observed that when cars equipped with brakes hung from their bodies are rounding sharp curves such brakes, owing to the swiveling of the truck, engage the wheels and the brake-rods are broken by the pressure therefrom, while the constant bearing of the guides on the wheels and the binding of the brake-shoes thereagainst while rounding curves entail a loss of motive power and the unnecessary wear of the brake-rigging. Also, so far as I am aware, there is not in use for the freight-service any satisfactory means for holding the brake-shoe away when the brake is released from and parallel with the wheels. The result of this omission is that the shoes bear either at the top or the bottom thereof on the wheels at all times and cause an unnecessary wear and waste of material, as well as loss in motive power.

Now it is the object of my hereinafter-described invention to obviate these objectionable features in car-brakes and provide a most economical brake of few parts and simple construction and one not liable to easily get out of order.

Referring to the drawings, the numeral 2 represents the side frame of a car-truck, preferably made of metal bars riveted together and having lateral or diagonal corner-braces 3 and arch-bars 4, which extend or project outward at each end of the truck, so as to form a support from which to hang the rocking cross-bar 5, from which the brake-beam is suspended. This bar 5 is mounted or journaled at each end in boxes 6, bolted to the under side of the ends of the arch-bars 4, and it is preferably formed of a tube 7, having a stiffener-plate 8, rigidly secured longitudinally by means of staples 9 9, which embrace the tube and pass through the plate and have their ends expanded or headed to secure them firmly in place, as is clearly shown in Figs. 13 and 14. The plate 8 is of greater width than the diameter of the tube 7 and extends above and below it, so as to strengthen or reinforce the tube, and thus with the least expenditure of material provide a very strong rocker-bar, while the extension of the plate, as described, also provides a bearing for the gooseneck-section 10 of the brake-hangers 11, which are rigidly secured to the said plate 8 over the tube by bolts, as shown. (See Figs. 10 and 11.)

The lower ends of the hangers 11 may be, as shown, stirrup-shaped or of any other desired or preferred form and are connected loosely to the brake-heads 12, to which the brake-shoes 13 are attached, as shown in dotted lines, Fig. 1, and solid lines, Fig. 3.

The ends of the tube 7 project beyond the ends of the plate 8 and enter the circular recesses formed in the body of the boxes 6 and are free to rotate therein. Near each end and at the middle of the plate 8 of the rocker cross-bar 5 are secured eyebolts 14, to the outer of which at each end are hung the hooks of the yielding safety-rods 15, the lower ends of which are secured to the brake-beam 16, which in this instance is a tube through which the rods pass transversely and are secured by nuts, as clearly shown in Figs. 5 and 9, arranged both above and below the tube. The yielding safety-rods 15 are composed of the rod 17, having a hook formed at one end to engage the eyebolts 14 and the other end being screw-threaded and, passing through the central perforations in the follower-plates 18, is secured against withdrawal by nuts, as shown in said Figs. 5 and 9.

The follower-plates 18 are somewhat diamond-shaped and are formed with perforations at each end for the insertion of the forked ends of the rod 19, which forms the lower member of the yielding safety-rod. The forked ends of the rod 19 are screw-threaded, and the upper plate 18 is held thereon by nuts, as shown, and between said plates and surrounding rod 17 are arranged the coiled springs 20, which may be compressed by the nuts which secure the plates 18 in place. The springs 20 permit of the brake-beam moving vertically to the full limit allowed by the brake-hangers. In Fig. 1 the rods 17 and 19 are shown reversed, and the hook is formed on rod 19 and the end of rod 17 is screw-threaded for attachment to the brake-beam and the same result obtained as before described.

To the central eyebolt 14 of the rocker cross-bar 5 is hooked the upper end of the adjusting-rod 21, the lower end of which is hooked into a staple 22 on the brake-lever fulcrum 23, the purpose of said rod 21 being to hold the brake-shoes parallel with the wheel when the brake is released. The rod 21 is in all respects similar in construction to the rods 15, excepting that it is formed with a hook at its lower end.

The brake-hangers are rigidly secured to the rocker cross-bar 5, as above described, in line with the center of wheel-tread, and thus prevent sidewise or lateral motion of the brake-shoes.

The release of the brake-shoes from the wheel is caused by the rocking of the cross-bar 5 in its bearings, which carries or swings the lower ends of the brake-hangers away from the wheels. The cross-bar 5 is turned or actuated by the weight of the brake-beam and the brake-heads, which as soon as the brake is released gravitate to their lowest position.

The safety-rods 15 serve as a substitute for the ordinary safety-chains, as well as to transmit the weight of the brake-beams and brake-heads to the cross-bar 5 to rock the same when the brake is released, this resulting by reason of the attachment of the safety-rods to the plate 8 above and at one side of the axis of the tube 7, so as to secure a leverage on the tube. The rocking or partial rotation of the cross-bar carries with it the parallel adjusting-rod 21; but the compression of the spring thereof is adjusted so as to poise or keep floating the brake-lever fulcrum the necessary height to hold the brake-shoes parallel with the wheel-tread when released. The brake-beam truss-rods also add their weight in assisting the return of the rocker cross-bar 5 to its normal position when the power is off the brake.

While I have described the cross-bar 5 as constructed of two parts or members rigidly secured together and such construction is preferred, yet I do not desire to be limited to such an arrangement, as it is obvious that the bar may be formed from a single piece of metal and that it may be squared in cross-section and have its ends reduced and turned so as to enter the boxes and turn therein, or it may be formed of a round bar or tube, with flat surfaces formed thereon for the attachment of the brake-hangers, and good results obtained. The construction first described embodies the advantages of strength and lightness in weight and the parts are of such shape that they do not require special machinery to produce them, and they can, therefore, be economically manufactured and are obtainable in the open market.

In applying my invention to inside-hung brakes (see Figs. 2, 3, and 23) I mount or secure the casting forming the truck side bearing 24 and brake-hanger bearing on the transom of the truck and the lateral or diagonal brace-bars 3, which connect the arch-bars 4 and the transom. The side bearings are formed of a single piece or casting having the projecting ends 28 formed with the vertical lugs 29, having perforations or pin-openings 26 formed therethrough. The upper ends 30 of the brake-hangers 11 in this instance are enlarged and flattened instead of being gooseneoked, and an opening 31 for the pin 32 formed therein. The ends 28 of the side bearings are slotted, as at 33, for the insertion of the ends of the brake-hangers, and the pin 32 is inserted through the openings 26 and the openings 31 in the brake-hangers in order to pivotally support the same in position from the side bearing. The slot 33 is of a length sufficient to permit of the free swinging of the brake-hangers in carrying the brake-beam to and from the wheels. The upper end of the brake-hangers are extended so as to form a shoulder 34, adapted to be engaged by a prong 35, formed on and parallel with the pin 32, as clearly shown in Figs. 24, 27, and 28, for the purpose of tilting said brake-hangers in order to carry the beam away from the wheels, and at one end the pin 32 is bent at right angles to form a crank-arm 36, in which an eye is formed to receive the hooked ends of the safety-rods 15, the latter being in all respects similar to the safety-rods hereinbefore described in connection with the outside-hung brakes and secured to the brake-beam 16 in a similar manner. The adjusting-rod 26 for holding the brake-shoes away from the wheels when they are released and keeping the brake-beams balanced is connected at one end to a staple 22 at the end of the brake-lever fulcrum 23, as above described, (see Fig. 29,) and at the other end to an eyebolt 37 on the transom instead of to the rock-bar 5, as described in connection with the outside-hung brakes; but its purpose and its operation, as well as its construction, are the same as that first described herein.

Having described my invention, what I claim as new, and desire to secure by Letters Patent, is—

1. The combination, in a car-brake, of a support for the brake-beam pivotally mounted on the truck-frame, brake-hangers rigidly connected to said support, and safety-rods connecting the support and brake-beam, whereby lateral motion of the brake-beam is prevented.

2. In a car-brake, the combination of a rocker cross-bar, a brake-beam, brake-hangers rigidly secured to said cross-bar, brake-heads, and yielding safety-rods connecting said cross-bar and brake-beam.

3. The combination, in a car-brake of a rocker cross-bar, a brake-beam, brake-hangers connecting said cross-bar and brake-beam, brake-heads carried by said brake-hangers, and elastic safety-rods connecting the brake-beam and cross-bar.

4. The combination, in a car-brake, of a rocker cross-bar, a brake-beam, brake-hangers for supporting said brake-beam from said cross-bar, and means connecting the said brake-beam and cross-bar adapted to yieldingly support said brake-beam when the brake is released.

5. The combination, in a car-brake, of a cross-bar pivotally mounted on the truck-frame, brake-hangers secured to said cross-bar, a brake-beam carried by said hangers, and means for yieldingly suspending said brake-beam from said cross-bar when the brake is released.

6. The combination, with a car-truck frame, of supports for the brake-beam pivotally mounted on said frame, brake-hangers carried by said supports, a brake-beam, and yieldable safety-rods connecting said supports and brake-beam.

In testimony whereof I affix my signature in presence of two witnesses.

JOHN S. FRANCIS.

Witnesses:
H. M. STERLING,
MARIE SPELLMAN.